United States Patent
Polosa et al.

(10) Patent No.: US 12,473,673 B2
(45) Date of Patent: Nov. 18, 2025

(54) NONWOVEN FABRIC AND THE PRODUCTION THEREOF

(71) Applicant: Suominen Corporation, Helsinki (FI)

(72) Inventors: Gian Luca Polosa, Varese (IT); Laura LaPlante, Collinsville, CT (US); Avinav G. Nandgaonkar, Vernon, CT (US)

(73) Assignee: Suominen Corporation, Helsinki (FI)

( * ) Notice: Subject to any disclaimer, the term of this patent is extended or adjusted under 35 U.S.C. 154(b) by 1403 days.

(21) Appl. No.: 16/829,097

(22) Filed: Mar. 25, 2020

(65) Prior Publication Data

US 2020/0308743 A1    Oct. 1, 2020

Related U.S. Application Data

(60) Provisional application No. 62/823,019, filed on Mar. 25, 2019.

(51) Int. Cl.
| | | |
|---|---|---|
| *D04H 1/495* | (2012.01) | |
| *D04H 1/54* | (2012.01) | |
| *D04H 1/70* | (2012.01) | |
| *D04H 3/02* | (2006.01) | |
| *G06K 7/14* | (2006.01) | |

(52) U.S. Cl.
CPC ............... *D04H 1/495* (2013.01); *D04H 1/54* (2013.01); *D04H 1/70* (2013.01); *D04H 3/02* (2013.01); *G06K 7/1408* (2013.01); *G06K 7/1447* (2013.01)

(58) Field of Classification Search
CPC ............ D04H 1/495; D04H 1/54; D04H 3/02; D04H 1/70; G06K 7/1447; G06K 7/1408
See application file for complete search history.

(56) References Cited

U.S. PATENT DOCUMENTS

| | | | |
|---|---|---|---|
| 6,287,419 B1* | 9/2001 | Takeuchi | D21H 13/08 |
| | | | 162/149 |
| 6,544,912 B1* | 4/2003 | Tanio | D04H 1/43835 |
| | | | 162/149 |
| 2009/0087475 A1 | 4/2009 | Sheehan | |
| 2013/0104330 A1 | 5/2013 | Dorsey et al. | |
| 2014/0004307 A1* | 1/2014 | Sheehan | D21H 27/40 |
| | | | 428/156 |
| 2014/0090217 A1 | 4/2014 | Jonsson et al. | |
| 2018/0236733 A1* | 8/2018 | Hollander | B29C 70/543 |

FOREIGN PATENT DOCUMENTS

| | | |
|---|---|---|
| EP | 1039024 A1 | 9/2000 |
| WO | WO2016173685 A1 | 11/2016 |
| WO | WO2017074421 A1 | 5/2017 |
| WO | WO2019115875 A1 | 6/2019 |

* cited by examiner

*Primary Examiner* — Jeremy R Pierce
(74) *Attorney, Agent, or Firm* — Laine IP Oy

(57) ABSTRACT

The present invention relates to a nonwoven fabric and the production thereof. More specifically, the invention relates to a dispersible and biodegradable nonwoven fabric comprising a web prepared using a wet lay forming process. The process involves forming a web from the aqueous suspension on a wire support, hydroentangling and drying the web. The web can be provided with a high quality hydroembossed pattern, which remains even in wet wipes prepared from the material.

15 Claims, No Drawings

NONWOVEN FABRIC AND THE PRODUCTION THEREOF

CROSS-REFERENCE TO RELATED APPLICATIONS

This application claims the benefit of and priority to U.S. Application No. 62/823,019, filed Mar. 25, 2019, the entirety of which is incorporated by reference herein.

FIELD OF THE INVENTION

The invention relates to a nonwoven fabric and the production thereof. More specifically, the invention relates to a dispersible and biodegradable nonwoven web prepared using a wet lay forming process. The process involves hydroentangling the web and providing the web with a high quality hydroembossed pattern, which remains even in wet wipes prepared from the material.

BACKGROUND

A significant number of requirements are applied to nonwoven consumer wipes. They must have sufficient strength and abrasion resistance for the purported use, they must have sufficient absorption capacity, and they must have sufficient biodegradability so as not to cause a long lasting environmental load. Legislation will become stricter and consumer awareness will rise. For consumer wipes for personal hygiene, an additional requirement of rising importance is water dispersibility, since too durable wipes tend to cause clogging problems in sewage systems.

Imprinting patterns on nonwoven material is desirable for a number of reasons. Apart from the obvious decorative aspect, patterns may convey information in a variety of ways; see international patent application No. PCT/FI2018/050902.

Wet laying is a web forming process which is a fast, economical, and environmentally friendly method. All the water used for wet laying is filtered and reused. The wet laying process provides better product performance as compared to the air lay process, because it can process short fiber such as wood pulp, and other natural, manmade and synthetic fiber. Wet laying of natural fibers provides better uniformity of the web and low linting due to strong hydrogen bonding between the fibers. The initial steps of wet laying a nonwoven web is analogous to papermaking. Wet laid webs require binding to provide strength. If the furnish includes thermoplastic material, heat may be used to partly melt that material, thereby consolidating the web. The presence of thermoplastics, however, is not desirable from a biodegradability point of view. If a binder is used, biodegrability is required of the binder as well, and this brings additional technical limitations. Therefore, it is desirable to provide nonwoven fabrics based on cellulosic materials such as manmade fibers exemplified by viscose, lyocell and natural fibers such as pulp. Avoiding binders is an additional advantage from an economical and ecological point of view.

Hydroentangling is a widely used method for consolidating webs in the production of nonwoven. The fibers are entangled by means of high pressure water jets. If the web is carried on a support having a patterned structure, the hydroentanglement process may leave a permanent pattern in the web, whereby the process may be referred to as hydroembossing.

In international patent application publication No. WO 2017/074421, a process is disclosed for forming a nonwoven web from an aqueous fiber suspension, hydraulically entangling the web and subjecting it to further hydroentanglement from both sides using a drum. The fiber suspension comprises synthetic staple fibers and cellulosic fibers. The web is carried through the hydroentangling process supported on one or several foraminous belts.

In US patent application publication No. 2014/0090217 is disclosed a method for producing a nonwoven material by hydroentangling a fiber mixture, wherein a web is wetlaid and hydroentangled. The web contains spunlaid filaments, natural fibers and synthetic staple fibers. After the initial hydroentanglement, spunlaid filaments are laid on top of the first web; a second fibrous web is wetlaid on top of the filaments; and the resulting web is hydroentangled from both sides in turn.

In international patent application publication No. WO 2016/173685 is disclosed an apparatus for consolidating and imposing a structure on a nonwoven web. The web is conveyed between two parallel bands, at least one of which is a structure-imposing band, and the web is subjected to hydroentanglement within a structure-imposing zone. The web can be subjected to further hydroentanglement operations before or after the structure-imposing zone, using rolls which can also impose a structure on one side of the web.

Thus, patterning in the prior art is conventionally carried out using thermal calendering or belt patterning. Changing a belt is time consuming. After changing a belt, tension adjustment in order to prevent belt breakage adds to the task. The path of a belt is not consistent; it may run straight or bend, and a pattern needs to survive variability in belt curvature. Current patterning techniques using a belt involves a risk of clogging of dewatering holes, since additional material is added on top of the belt. As patterning is usually done without prior entanglement of the web, there is also a risk of creating holes in the nonwoven, since patterning moves the fibers. This is particularly serious when producing low basis weight products. A belt patterning unit is long, so if there would be two different hydroentangling units, the size of the machine would grow significantly.

Thermal calendering is associated with other drawbacks. The presence of synthetic fibers makes it possible to create sharp patterns by melting those fibers. However, biodegradable fibers will not melt at the usual temperatures. Pressure is the main factor in creating the pattern, and heat can only enhance the effect. The resolution in the pattern is necessarily affected. Patterns created in biodegradable material usually suffer significantly when moistened.

When thermal calendering is used, pattern retention is very weak or nonexistent in fabrics comprising no thermoplastic fiber as the product is wetted. Hydroentanglement and hydroembossing of a wet laid web according to the prior art does not produce a nonwoven material having a pattern of sufficiently high definition for the purposes mentioned above. Moreover, prior art wet laid patterned nonwovens tend to lose the patterning when wetted with various liquids and lotions used for sealedly packed wet wipe products.

Definitions

The term "nonwoven web or fabric" as used herein refers to a web having a structure of fibers or filaments which are interlaid without exhibiting a regular pattern as in a woven fabric.

Short cut fiber (regenerated/synthetic) as referred to herein is in the range of 3 mm to 18 mm. It can be used in wetlaid and airlaid production.

Regenerated fiber is a fiber created by converting cellulose to a soluble cellulosic derivative and subsequently regenerating it to fiber. Examples are lyocell, tencel, rayon and viscose.

Natural fiber is a cellulose fiber of natural origin. Examples are wood pulp and fiber from hemp, flax, cotton, jute, bamboo, sisal and kapok.

The term "machine direction" as used herein refers to the direction of travel of the forming support receiving fibers during formation of the web.

The term "cross machine direction" as used herein refers to the direction perpendicular to the machine direction as above.

A slosh box is a device designed especially for disintegration tests according to FG502 of the INDA/EDANA guidelines.

SUMMARY

According to an aspect of the present invention, a fiber suspension is prepared and subjected to wet laying on a wire.

The resulting fiber suspension to be subjected to wet laying according to the present invention has a composition comprising about 5%-45% by weight of regenerated short cut fibers and about 55%-95% by weight of natural fibers.

The short cut fibers comprise fibers of different length. In particular, in an embodiment, the short cut fibers comprise 80%-90% by weight of fibers of a length in the range 3 mm to less than 6 mm (e.g., 5.99) and 10%-20% by weight of fibers of a length in the range 6 mm-12 mm. In an embodiment, 10%-20% by weight of the short cut fibers have a length in a range 6-8 mm and 80-90% by weight have a in a range of 4-5 mm. When combining these differing percentages and lengths of short cut fibers, it was surprisingly found that good strength values are obtained with dispersibility on par with dry toilet paper.

The longer fibers add increased strength to the fabric and shorter fibers ensure the dispersibility speed of the entire product. In addition, the above-described combination of longer and shorter fibers is critical to maintain the structural integrity of the product in use, but still render it dispersible when disposal is desired so that it will not create blockages in sewer systems or the like.

In an embodiment, the natural fibers have a length in the range 1 mm to 3 mm. In an embodiment, the natural fibers have a dtex in the range of 1.0 to 1.4.

Using this suspension, a first web is wet laid on a wire.

The wetlaid layer is subsequently consolidated using hydroentanglement. The initial wet laying can be carried out on the same wire as the hydroentanglement, or separate wires may be employed. The tensile strength of the web following the consolidation should be at least 200 g/25 mm. This strength is sufficient to allow the removal of the web from the wire.

The web is thus self-supporting and may be transferred to a hydroembossing station comprising a roll having a surface pattern which is imposed on the web, forming a high definition three-dimensional pattern. The hydroembossing can occur from either side of the web relative to the initial hydroentanglement.

In an embodiment, the pattern is on a sleeve which is detachable from the roll. The pattern resolution and the hydroembossing parameters in combination with the degree of consolidation in the web at the time it reaches the roll provide a pattern which is of sufficiently high definition and persistence to satisfy the requirements of information coding and permanency in the wet state, for example, when a product is lotionised in conversion to packaging. Suitable sleeves for use in the processes described herein are disclosed in PCT publication No. WO2020/021158, the entirety of which is incorporated by reference herein.

The consolidation of the web following wet laying, carried out through hydroentangling, shall provide a tensile strength which preserves the web in a consistent shape as it is lifted from the forming wire. Too little consolidation may cause, apart from the obvious risk of web breakage, holes in the web. Excessive consolidation does not leave sufficient formability in the web for the subsequent hydroembossing step carried out on a roll.

A high definition pattern as used herein refers to a pattern exhibiting a contrast between differing areas which is sufficient for machine reading, e.g. using methods disclosed in International Patent Application No. PCT/FI2018/050902 (WO 2019/115875), the entirety of which is incorporated by reference herein.

DETAILED DESCRIPTION

Advantageously, the fiber suspension has a solids content in the range 0.5% to 5%. In an embodiment, the short cut fibers in the suspension have a dtex in the range of 0.7 to 2.2, and in a particular embodiment in the range of 0.9-1.7 dtex.

Preferably, the appropriate degree of consolidation is a consequence of using the composition set out above and the following parameters:

| Speed (ft/min) | Nozzle psi | Nozzle size μm | Vacuum (mbar) |
| --- | --- | --- | --- |
| 500-1200 | 1-1200 | 5 to 150 | 20-700 |

Following hydroentanglement and dewatering on a wire, the tensile strength of the web is in the range 80 to 120% of its final tensile strength.

Following the hydroentanglement and dewatering step, the web is transferred to a hydroembossing roll having a surface pattern which is imposed on the web, forming a high definition three-dimensional pattern. Preferably, the pattern is on a sleeve supported by the roll.

Inside the roll there will be a partial vacuum for removing excess water from the hydroembossing through provided openings. In an embodiment, 1 to 5 nozzle bars are used for hydroembossing the web.

In a high definition pattern, fibers have been moved from their initial location in the plane of the web, creating a three-dimensional structure which is more distinct than the two-dimensional patterns that can be created using belt hydroembossing or thermal calendaring.

In the following discussion, the top surface of the fabric is the surface that faces the sleeve during the hydroembossing operation; the bottom surface is the one exposed to the water jets.

For considering the three-dimensional structure of the web of the present invention, the base level is defined as the level of the bottoms of the deepest depressions in the fabric, i.e. the level of the thinnest areas in the fabric or a minimum thickness of the fabric. In an embodiment, the thickness of the fabric at its thinnest points or minimum thickness is at least 30 μm.

The embossing level is a level on the top surface of the fabric which is farthest or at a maximum distance from the base level. Put another way, the embossing level comprises areas (elevated portions) with a maximum thickness of the fabric. In this context, a pattern in a nonwoven web is considered a three-dimensional high definition pattern if the embossing level or maximum thickness is at least 200 μm above the base level or minimum thickness. In the present context, this dimension may also be referred to as a height of the pattern. In an embodiment, the embossing level or maximum thickness is at least 250 μm; and in other embodiments is at least 300 μm above the base level of the fabric. The angle of inclination in a high definition three-dimensional pattern refers to the angle of the slope of the elevated portions of the fabric relative to a plane of the base level. In a three-dimensional high definition pattern, the angle of inclination of the rise from the base level to respective elevated portion(s) is in the range 48° to 90°; preferably in the range of 55°-88°. In certain embodiments, the 3D pattern is machine readable.

Angles and dimensions in nonwoven fabric structures may be determined using laser triangulation technology. Further, angles and dimensions of the embossing tool may be determined.

As a portion of the fibres are moved from their original location during hydroembossing using a sleeve, the grammage of the patterned portions of the fabric, i.e. the portions of the fabric receiving the displaced fiber increases at least 10% by weight, e.g., 10-30% by weight or 15-30% by weight. Thus, the patterned areas contain at least 10% by weight more fiber than the non-patterned areas.

Inside the roll there will be a partial vacuum for removing excess water from the hydroembossing. In an embodiment, there are from 1 to 5 hydroentanglement units hydroembossing the web.

The web is subsequently subjected to drying using e.g. an air dryer, a can dryer, an omega dryer or combinations of these.

In an embodiment, the basis weight of the finished nonwoven fabric according to the invention is in the range 50 to 120 gsm.

In at least one embodiment, the suspension may be laid on the wire on top of a second, previously unwound web which is of the spunlace, wetlaid or tissue type. In at least one embodiment, a third layer of unwound material of the types mentioned above may be applied on top of the first, wetlaid layer.

In at least one embodiment, the suspension may be laid on the wire in several steps. Further, layers can be added using air laying or carding technology.

The nonwoven fabric according to the invention wetted with liquid 2.5 times the weight of dry nonwoven fabric and aged for more than one week had a slosh box dispersibility of more than 94% in 5 min and 98% in 10 min, similar to dry toilet tissue. Overall, the dispersibility ranges for a fabric according to the invention are from 94% to 99% for a 5 min slosh box test. All slosh box tests were carried out according to EDANA & INDA FG502 (GD4) Guidelines.

As set forth above, aspects of the present invention provide for a material that has excellent structural integrity in use, but also desirable water dispersability properties.

In one aspect, there is provided a nonwoven fabric comprising hydroentangled fibers, the fibers comprising about 5%-45% by weight of regenerated short cut fibers and about 55%-95% by weight of natural fibers, wherein 10%-20% by weight of the short cut fibers have a length in a range of 6-12 mm and 80%-90% by weight have a length in a range of from 3 mm to less than 6 mm. In an embodiment, 10%-20% by weight of the short cut fibers have a length in a range 6-8 mm and 80-90% by weight have a in a range of 4-5 mm.

In another aspect, there is provided a method for producing a nonwoven fabric material, comprising:
providing an aqueous suspension of fibers comprising about 5%-45% by weight of regenerated short cut fibers and about 55%-95% of natural fibers, wherein 10%-20% by weight of the regenerated short cut fibers have a length in a range of 6-12 mm and 80%-90% by weight of the regenerated short cut fibers have a length in a range of 3 to less than 6 mm:
forming a web from the aqueous suspension on a wire support;
hydroentangling the web; and
drying the web to the produce nonwoven fabric material.

In an embodiment of the method, 10%-20% of the short cut fibers have a length in a range 6-8 mm and 80-90% by weight have a length in a range of 4-5 mm.

EXAMPLE

In the following example, the short cut fibers are viscose. A first group of short cut fiber has a length of 5 mm, and a second group of short cut fiber has a length of 8 mm. The dtex of the short cut fiber is either 0.9 or 1.7 dtex. Further, the compositions comprise softwood pulp. The results set out in Table 1 clearly show, that when only shorter regenerated short cut fibers are used (Sample A), the tensile strength values are clearly inferior to those of samples B, C and D. When only longer regenerated shortcut fibers are used (sample E), decreased dispersibility is obtained. The weak strength and 100% slosh box (10 min) values are due to the 25% lower basis weight. When combining 5 mm and 8 mm short cut fibers, good strength values are obtained with dispersibility on par with dry toilet paper.

Table 1 shows test results of various nonwoven fabric made with different compositions compared to dry toilet tissue. Samples B, C and D are in accordance with the invention.

TABLE 1

| Basis Weight (gsm) | Shortcut Fiber A/Fiber B | % of Fiber A/B | % of Pulp | Wet MD g/50 mm | Wet CD g/50 mm | Slosh Box (5 min) | Slosh Box (10 min) | Sample Code |
|---|---|---|---|---|---|---|---|---|
| 80 | 0.9 dtex*5 mm | 40% | 60% | 852 | 580 | 98.95 | 99.80 | A |
| 80 | 1.7 dtex*5 mm/1.7 dtex*8 mm | 35%/5% | 60% | 1160 | 518 | 98.29 | 98.02 | B |
| 80 | 1.7 dtex*5 mm/1.7 dtex*8 mm | 25%/5% | 70% | 1010 | 454 | 94.64 | 98.49 | C |
| 80 | 0.9 dtex*5 mm/1.7 dtex*8 mm | 35%/5% | 60% | 1070 | 404 | 99.84 | 100 | D |
| 60 | 1.7 dtex*8 mm | 30% | 70% | 820 | 530 | 85 | 100 | E |
| 80 | Pulp | 0% | 100% | | | 95.28 | 99.04 | Toilet Tissue (Dry) |

International Water Services Flushability Group (IWSFG) (PAS) 3: Disintegration Test Method-Slosh Box, is a modified version of the INDA/EDANA slosh box test.

In this test, sample B has a slosh box dispersibility percentage of 97.37%. Overall, the dispersibility ranges according to (IWSFG) (PAS) 3 for a fabric according to the invention are more than 95% in 30 min.

The invention claimed is:

1. A nonwoven fabric comprising hydroentangled fibers, the fibers comprising about 5%-45% by weight of regenerated short cut fibers and about 55%-95% by weight of natural fibers, wherein 10%-20% by weight of the regenerated short cut fibers have a length in a range of 6-12 mm and 80%-90% by weight have a length in a range of from 3 mm to less than 6 mm,
   wherein the nonwoven fabric comprises a three-dimensional pattern formed into the nonwoven fabric,
   wherein the three-dimensional pattern defines a difference in the thickness in the nonwoven fabric,
   wherein the difference in thickness comprises a difference between a maximum thickness and a minimum thickness in the nonwoven fabric, and
   wherein the three-dimensional pattern defines a machine readable code.

2. The nonwoven fabric according to claim 1, wherein 10%-20% by weight of the regenerated short cut fibers have a length in a range 6-8 mm and 80-90% by weight have a length in a range of 4-5 mm.

3. The nonwoven fabric according to claim 1, wherein the regenerated short cut fibers have a dtex in a range 0.7 to 2.2 dtex.

4. The nonwoven fabric according to any claim 1, wherein the regenerated short cut fibers are selected from the group consisting of, lyocell, viscose, rayon, and tencel.

5. The nonwoven fabric according to claim 1 wherein the natural fibers are formed from a material selected from the group consisting of wood pulp, hemp, flax, cotton, jute, bamboo, sisal, jute, and kapok.

6. The nonwoven fabric according to claim 1, wherein the difference between the maximum thickness and the minimum thickness of the nonwoven fabric is at least 200 μm.

7. The nonwoven fabric according to claim 1, wherein the three-dimensional pattern comprises an angle of inclination between the minimum thickness and the maximum thickness in a range of 48°-90°.

8. The nonwoven fabric according to claim 1, wherein the three-dimensional pattern comprises at least 10% more fibers by weight than a non-patterned area of the nonwoven fabric.

9. The nonwoven fabric according to claim 1, wherein the nonwoven fabric comprises a basis weight of 50 gsm-120 gsm.

10. The nonwoven fabric according to claim 1, wherein a machine direction (MD) wet strength of the nonwoven fabric is in a range of 650 g/50 mm to 1400 g/50 mm and a cross direction (CD) wet strength is in a range of 400 g/50 mm to 650 g/50 mm.

11. The nonwoven fabric according to claim 1, wherein upon wetting of the nonwoven fabric with liquid 2.5 times a weight of the nonwoven fabric and aging for more than one week, the nonwoven fabric has a slosh box dispersibility according to EDANA & INDA FG502 (GD4) Guidelines of more than 94% in 5 min and 98% in 10 min.

12. The nonwoven fabric according to claim 1, which, when wetted with liquid 2.5 times the weight of the nonwoven fabric and aged for more than one week, has a slosh box dispersibility according to IWSFG Test Methods of more than 95% in 30 min.

13. The nonwoven fabric according to claim 1, wherein the natural fibers have a length in a range of 1-3 mm and a dtex in a range of 1.0 to 1.4 dtex.

14. A method for producing a nonwoven fabric material, comprising:
   providing an aqueous suspension of fibers comprising about 5%-45% by weight of regenerated short cut fibers and about 55%-95% of natural fibers, wherein 10%-20% by weight of the regenerated short cut fibers have a length in a range of 6-12 mm and 80%-90% by weight of the regenerated short cut fibers have a length in a range of 3 to less than 6 mm:
   forming a web from the aqueous suspension on a wire support;
   hydroentangling the web;
   removing the web from the wire support and transferring the web to a hydroembossing roll; and
   drying the web to the produce nonwoven fabric material
   wherein the hydroentangling comprises hydroembossing the web,
   wherein the hydroembossing roll forms a three-dimensional pattern on the nonwoven fabric,
   wherein the three-dimensional pattern defines a difference in thickness in the nonwoven fabric,
   wherein the difference in thickness comprises a difference between a maximum thickness and a minimum thickness in the nonwoven fabric, and
   wherein the three-dimensional pattern defines a machine readable code.

15. The method according to claim 14, wherein 10%-20% of the short cut fibers have a length in a range 6-8 mm and 80-90% by weight have a length in a range of 4-5 mm.

* * * * *